United States Patent [19]
Nishijima et al.

[11] Patent Number: 5,138,504
[45] Date of Patent: Aug. 11, 1992

[54] TAPE TRANSPORT CONTROL APPARATUS FOR SWITCHING FROM HIGH SPEED REEL DRIVE TO LOW SPEED CAPSTAN DRIVE WITHOUT STOPPING THE TAPE

[75] Inventors: Hideo Nishijima; Kooji Kaniwa; Kouji Fujita; Yuji Inaba

[73] Assignee: Hitachi, Ltd., Tokyo, Japan

[21] Appl. No.: 493,407

[22] Filed: Mar. 14, 1990

[30] Foreign Application Priority Data

Mar. 17, 1989 [JP] Japan .................................. 1-63620

[51] Int. Cl.$^5$ .............................................. G11B 15/48
[52] U.S. Cl. .............................. 360/73.06; 360/73.05; 360/96.1; 242/188; 242/191
[58] Field of Search ..................... 360/69, 73.04, 73.05, 360/73.06, 96.1; 242/188, 191

[56] References Cited
FOREIGN PATENT DOCUMENTS

61-198460  9/1986  Japan ................................... 242/191

*Primary Examiner*—Aristotelis Psitos
*Assistant Examiner*—David L. Robertson
*Attorney, Agent, or Firm*—Fay, Sharpe, Beall, Fagan, Minnich & McKee

[57] ABSTRACT

A tape transport control apparatus relating to changing means of high speed reel control transport and low speed capstan control transport in a tape transport control of a magnetic recording regenerative apparatus or the like. Particularly in a period of transition from the high speed driving state to the low speed driving state, a capstan motor is controlled through means for comparing phase of the control signal of the tape transport speed regenerated on the tape with phase of the capstan frequency generator signal of the capstan, and after the phase comparing means detects that the tape speed and the capstan rotational speed are coincident, the pinch roller is pressed against the capstan.

12 Claims, 7 Drawing Sheets

TAPE TRANSPORT CONTROL APPARATUS FOR SWITCHING FROM HIGH SPEED REEL DRIVE TO LOW SPEED CAPSTAN DRIVE WITHOUT STOPPING THE TAPE

BACKGROUND OF THE INVENTION

The present invention relates to a method of changing the high speed reel control transport and the low speed capstan control transport in tape transport control of a magnetic recording playback apparatus or the like and an apparatus using the method.

As an apparatus in the prior art, for example, as described in Japanese patent application laid-open No. 198460/1986, in order to drive a tape at high speed, a reel driving means is disclosed where the tape is transported at high speed and constant speed in capstan-less state. That is, as a method of making the tape speed constant, the tape is grasped by a capstan and a pinch roller and the rotational speed of the capstan is made constant thereby the tape speed is made constant. However, if the tape speed remaining intact is made high speed, it is difficult in the mechanism of the driving apparatus and the tape is liable to be damaged. Consequently, a method of making the tape speed constant in capstan-less state has been used. In this method, however, the stable transport in capstan-less state becomes difficult at low speed on the contrary. Consequently, after all, two-mode system is required where the low speed transport by capstan driving and the high speed transport by reel driving are specifically distinguished with discontinuity.

Speaking it more specifically, in the prior art as above described, it is difficult that the capstan driving mode at low speed transport (low speed capstan driving mode or referred to simply as capstan driving mode or only as low speed driving mode) and the reel driving mode at high speed transport (high speed reel driving mode or referred to simply as reel driving mode or only as high speed driving mode) are covered from high speed to low speed continuously. That is, particularly during transport from the high speed transport (reel driving) to the low speed transport (capstan driving), the pinch roller must be pressed against the capstan in the tape transport state. In this case, due to the speed error between the tape transport speed and the capstan rotational speed, abnormal tension is applied to the tape and a problem of damage of the tape may be produced. Consequently, it is difficult to realize the continuous covering of both modes.

Therefore in the apparatus in the prior art, in the transferring from the high speed transport (high speed mode) to the low speed transport (low speed mode), such discontinuous operation is inevitable that after transport of the tape is once stopped, the pinch roller is pressed and then the starting to the low speed transport is performed (moving to the low speed transport) and therefore the operation becomes difficult. Also in the above-mentioned apparatus, since the stop state of the tape is once entered so as to press the pinch roller, time is required until attaining the normal capstan driving state. For example, in heading of the tape (positioning at prescribed portion), troublesomeness in the operation and the obstacle in the high speed operation are inevitable.

SUMMARY OF THE INVENTION

An object of the invention is to perform smoothly the transferring from the high speed reel driving state to the low speed capstan driving state, which technology cannot be easily realized in the apparatus of the prior art and is impossible in the actual state and also is left out of consideration. That is, the invention relates to the apparatus where the transferring from the high speed reel driving to the low speed capstan driving is executed not in the state of stopping once the driving of the tape as in the prior art but in the tape transport state as it is (without stopping the transport speed of the tape), and even if the pinch roller is pressed in the low speed capstan driving state the tape is not damaged, and it relates particularly to the apparatus provided with the tape transport speed control and the capstan rotational speed control of high precision.

DESCRIPTION OF THE PREFERRED EMBODIMENTS

Figure 1:
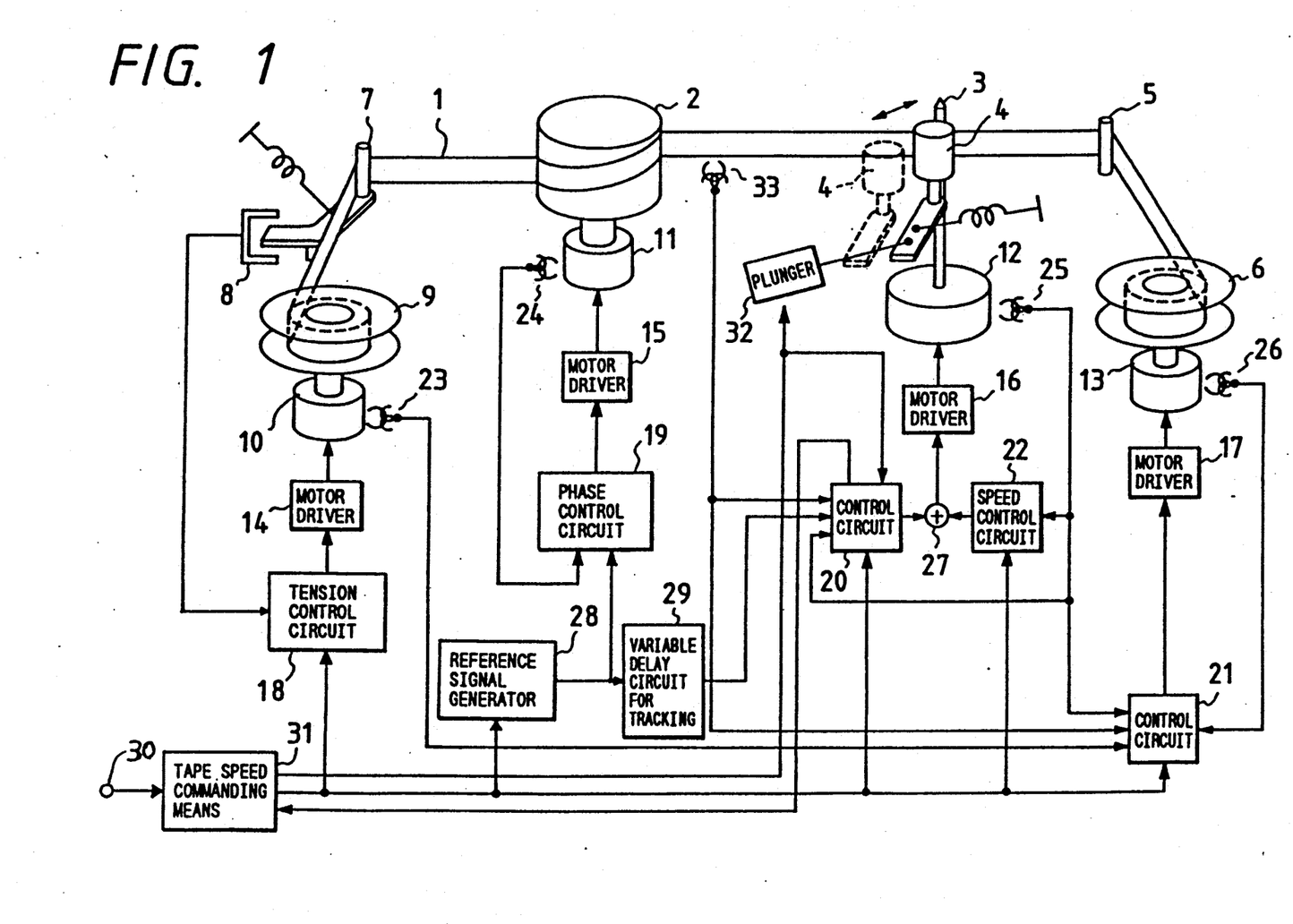
FIG. 1 is a circuit block diagram of a tape transport control system as an embodiment of the invention.

In order to attain the foregoing object of the invention, in a period of transition from the high speed reel driving state to the low speed capstan driving state, means is provided in that for example, as shown in FIG. 1, control signal of the tape transport speed regenerated on a tape 1 and the capstan frequency generator signal (CFG) of a capstan 3 control a capstan motor 12 through a phase comparing means 20, and after the phase comparing means 20 detects that the tape speed and the capstan rotational speed are coincident well, a pinch roller is pressed against the capstan.

Also as the above-mentioned capstan frequency generator signal (CFG), the capstan FG signal representing the rotational frequency of the capstan motor is frequency-divided in a suitable dividing ratio, and signal having frequency nearly equal to that of the regenerative control signal is used.

Further, means is provided so that when the regenerative control signal is not detected for a definite period, after the tape transport is stopped at the reel driving state as it is, the pinch roller is pressed against the capstan and transferring to the aimed speed mode is again performed by the capstan driving state.

Also in the high speed reel driving state, the capstan is controlled to nearly the maximum speed within the low speed capstan driving range, and the transferring from the high speed reel driving state to the low speed capstan driving state is smoothly controlled.

During the low speed capstan driving, a supply reel 9 is driven so that constant tension is generated in the back tension direction (A tension sensor 8 is utilized so as to make the tension constant.), and a take-up reel 6 is driven so that the tape driven by the capstan 12 is taken up at the constant tension. Further the transferring to the high speed reel driving state is performed in that the pressing of the pinch roller is released and at the same time the control of the take-up reel 6 is transferred to from the constant tension control until then to the speed control.

The phase comparing means during the period of transition from the high speed reel driving state to the low speed capstan driving state regenerates the control signal CTL (refer to FIG. 5) recorded on the magnetic tape and performs the phase comparison of the regenerative control signal as reference signal with feedback pulse obtained from the capstan frequency generator signal (CFG) obtained in response to the capstan rotational speed, and controls the capstan motor to drive the capstan by the output signal of the phase comparison. In this control, since the tape speed in reel driving and the capstan speed are nearly equally controlled, even when the pinch roller is pressed the speed turbulence (or turbulent speed) is not produced in the tape speed and the tape tension variation can be made sufficiently small. As a result, the transferring from the reel driving to the low speed capstan driving can be performed without damaging the tape. The speed in this state (when the pinch roller is pressed) may be made, for example, the maximum speed within the capstan driving range. In this case, the capstan frequency generator signal (CFG) obtained in response to the capstan rotational speed has sufficiently high frequency, and this frequency is divided by integer N thereby frequency being nearly equal to that of the regenerative control signal can be obtained. Consequently, the error between the tape speed and the capstan speed may be made 1/N at most.

Further since the above-mentioned phase comparison is impossible in an unrecorded tape where no regenerative control signal is detected in the above-mentioned system, means for discriminating presence/absence of the regenerative control signal is provided, and the transferring from the high speed reel driving to the low speed capstan driving is performed based on the discrimination and unlike the above-mentioned system in that the tape transport is stopped once in the reel driving state (Then the capstan is also in the stopped state.), and then the pinch roller is pressed and the transferring to the aimed speed is again performed by the capstan driving. In this case, since the displayed image becomes noise due to the unrecorded tape, no problem is particularly produced in the image. Also even if the unrecorded tape once passes through the stop mode as above described, this does not particularly become a problem in the use convenience (In most cases, smooth control with high precision as above described is required for the recorded tape.).

An embodiment of the invention will now be described referring to FIGS. 1 through 7.

In FIG. 1, numeral 1 designates a magnetic tape, numeral 2 designates a cylinder, numeral 3 designates a capstan, numerals 4, 4' designate a pinch roller, numeral 5 designates a guide pin, numeral 6 designates a take-up reel, numeral 7 designates a tension sensor pin, numeral 8 designates a tension sensor, numeral 9 designates a supply reel, numeral 10 designates a supply reel motor, numeral 11 designates a cylinder motor, numeral 12 designates a capstan motor, numeral 13 designate a take-up reel motor, numerals 14, 15, 16, 17 designate motor drivers, numerals 18, 19, 20, 21 designate control circuits, numeral 22 designates a speed control circuit, numerals 23, 24, 25, 26 designate frequency generators, numeral 27 designates an adder, numeral 28 designates a reference signal generator, numeral 29 designates a variable delay circuit for tracking, numeral 30 designates an input terminal of tape speed data, numeral 31 designates a tape speed commanding means, numeral 32 designates a plunger for performing pressing/releasing of the pinch roller 4, 4', and numeral 33 designates a control head.

Next, its operation will be described. In the low speed capstan driving state, the magnetic tape 1 passes through the supply reel 9 and the tension sensor pin 7 and is wound on the cylinder 2 and pressed between the pinch roller 4 and the capstan 3 and driven, and passes through the guide pin 5 and is taken up to the take-up reel 6. In this case, the supply reel 9 is driven by the supply reel motor 10 and the motor driver 14 and the control circuit 18 thereof, and the control is performed so that the tension state of the magnetic tape 1 is detected at the position of the tension sensor pin 7 and fed back as output of the tension sensor 8 to the control circuit 18. Thereby the control is performed by output of the tape speed commanding means 31 to generate the back tension in the supply reel 9 so that the optimum tape tension is produced in response to the speed state of each tape. Next, the cylinder 2 is driven by the cylinder motor 11 and the motor driver 15 and the control circuit 19 thereof, and the control in the control circuit 19 is performed so that the feedback pulse from the frequency generator 24 to detect the rotational phase of the cylinder motor 11 is phase-locked (or phase matching also in hereinafter description) with the output pulse of the reference signal generator 28. Next, the capstan 3 is driven through the capstan motor 12 and the motor driver 16 and the adder 27 thereof by the control circuit 20 and the speed control circuit 22. The control in the control circuit 20 is performed so that control signal recorded in the control track of the magnetic tape 1 is detected by the control head 33 and the control pulse in this case is phase-locked with the reference signal obtained through the variable delay circuit 29 for tracking. Also the speed control circuit 22 performs control to assist the phase locking so that the tape speed becomes nearly the aimed speed. By the output pulse of the tape speed commanding means 31 in this case, the control pulse or the reference signal is frequency-divided in M and phase-locked. For example, at the play back in twice of the normal speed by the tape speed commanding means 31, the control pulse is frequency-divided in two, and at the play back in ½ times of the normal speed, the reference signal is frequency-divided in two. Next, the take-up reel 6 is driven by the take-up reel motor 13 and the motor driver 17 and the control circuit 21 thereof, and the control is performed so that the take-up tension of the magnetic tape 1 becomes constant to a desired value. That is, from the frequency generators 25, 26 (The frequency generator 23 may be also used.), the winding diameter of the magnetic tape 1 of the take-up reel 6 is calculated in the control circuit 21, and corresponding to this calculation the prescribed torque is generated in the take-up reel motor thereby the take-up tension is controlled constant. Also the tension correction in response to the speed of each tape is performed by the signal from the tape speed commanding means 31 if necessary. According to the above-mentioned operation, the low speed capstan driving state can be obtained.

Next, the high speed driving state will be described. In this state, the pinch roller 4' is driven by the plunger 32 and the pressing against the capstan 3 is released. Then the supply reel 9 is controlled to generate the prescribed back tension in similar manner to the low speed capstan driving state. Also the cylinder 2 is controlled in similar manner to the low speed capstan driving state. However, if necessary, the period of the reference signal generator 28 may be varied by signal from the tape speed commanding means 31 and the cylinder speed may be varied. On the other hand, the control of the capstan 3 and the take-up reel 6 is different from the low speed capstan mode as follows. Since the capstan 3 cannot be controlled stably beyond the maximum speed of the low speed capstan driving range, it is held to the maximum speed state. However, the capstan 3 does not contact with the magnetic tape 1 and is therefore rotated independently. Next, the take-up reel 6 is driven by the take-up motor 13 and the motor driver 17 and the control circuit 21 thereof, and the control is performed based on the speed command supplied from the tape speed commanding means 31 so that the magnetic tape 1 attains the desired speed. That is, the winding diameter of the magnetic tape 1 of the take-up reel 6 is calculated and the desired rotational speed of the take-up reel 6 is calculated in response to the winding diameter by the result of the arithmetic means, and the output of the frequency generator 26 is made the feedback pulse and the rotational speed of the take-up reel motor 13 is controlled. Further, control means of high precision is provided so that the control signal regenerated from the control head 33 is made the feedback pulse and the desired frequency is obtained in response to the speed command. Thus the high speed reel driving is realized.

Figure 2:
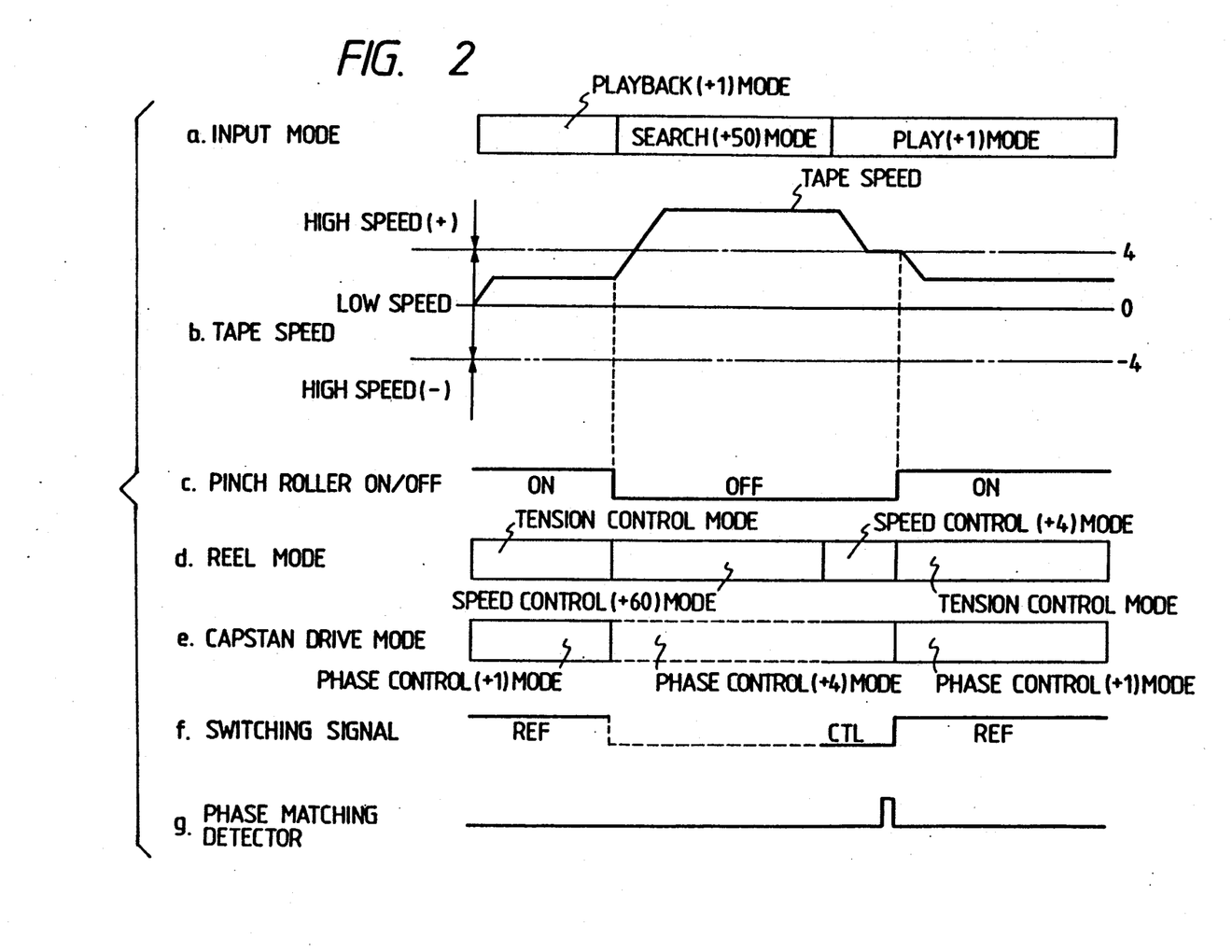
FIG. 2 is a time chart illustrating operation of main part in FIG. 1.

Next, the transferring means from the high speed reel driving to the low speed capstan driving will be described using the waveform chart of FIG. 2. In FIG. 2, the low speed capstan driving range is less than ±4 of the normal playback speed. Then the transferring from the normal playback (+1) mode to the high speed search (for example, 50 times of the normal playback speed) mode is performed in that when the command is inputted from the input terminal 30 of tape speed data to the tape speed commanding means 31 by an operation button (not shown) of 50 times of the normal playback speed, the plunger 32 is driven from the tape speed commanding means 31 and the pinch roller 4' is released from the capstan 3 and at the same time the speed command is transmitted to each of the control circuits 18, 20, 21 and the speed control circuit 22. Thereby the take-up reel 6 is transferred from the tension control state to the speed control state, and the tape speed rises aiming 50 times of the normal playback speed. On the other hand the capstan 3 rises aiming nearly four times of the normal playback speed.

Next, the period of transition from the high speed search of 50 times of the normal playback speed to the normal playback (+1) mode will be described. Then the take-up reel 6 once falls aiming four times of the normal playback speed. In this case, the speed control circuit 22 of the capstan 3 is controlled previously to four times of the normal playback speed, and the control circuit 20 is controlled so that the reference signal generated from the reference signal generator 28 by signal represented by the switching signal f from the tape speed commanding means 31 is changed to the regenerative control signal obtained from the control head 33 by the signal passing through the variable delay circuit 29 for tracking, and the feedback pulse 2 obtained from the frequency generator 25 of the capstan motor 12 is phase-locked with the regenerative control signal. Thereby the rotational speed of the capstan 3 can be matched with the speed of the magnetic tape 1. For example, even if the speed error of ±10% is produced for the aimed speed (four times of the normal playback speed) of the tape in the reel driving state, since the rotational speed of the capstan 3 can be matched with the tape speed, the speed error between both can be made very small. In this case, finishing of the phase matching between both is detected in the control circuit 20 (FIG. 2, waveform g), and this is returned to the tape speed commanding means 31. According to this signal g, the tape speed commanding means 31 drives the plunger 32 and presses the pinch roller 4 against the capstan 3 (waveform c). If the pressing is finished, the capstan driving state is produced and the take-up reel 6 is transferred to the tension control system (waveform d). According to command from the tape speed commanding means 31, the capstan 3 is transferred from the speed of four times of the normal playback speed until then to the normal playback speed being the finally aimed value (waveform e). The input command (input mode a) and the actual tape speed (waveform b) in this case are shown respectively.

Figure 3:
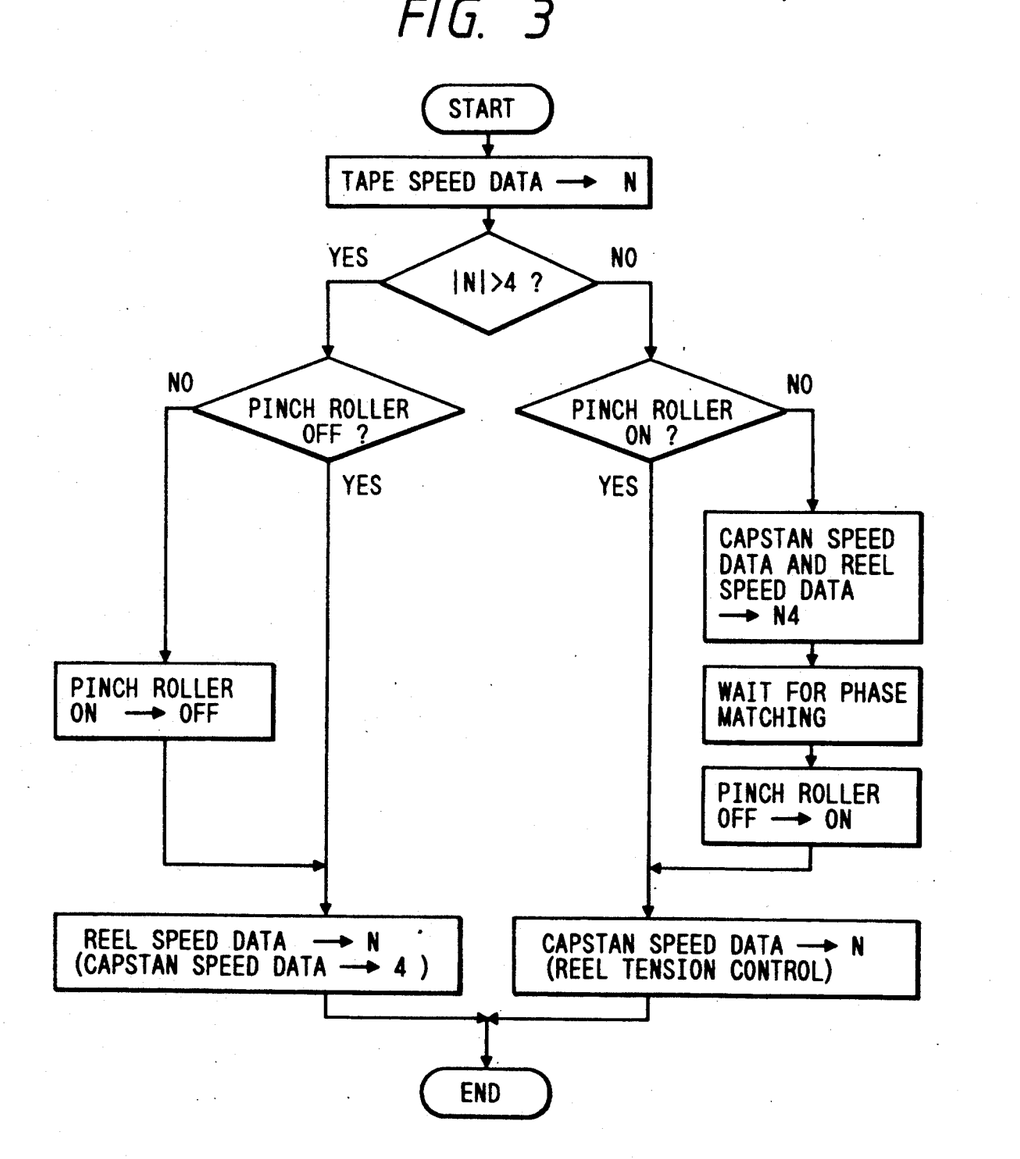
FIG. 3 is a flow chart illustrating operation of tape speed commanding means in FIG. 1.

FIG. 3 shows a flow chart of the tape speed commanding means 31 for commanding the above-mentioned operation. The speed mode commanded by an operation button or the like is inputted from the input terminal 30 of tape speed data. In response to this signal the tape speed commanding means 31 acts in accordance with the flow chart shown in FIG. 3. That is, it is discriminated whether the absolute value of the input command N is larger than the speed of four times of the normal playback speed or not. If it is larger (YES), the ON/OFF of the pinch roller in this time point is confirmed. In the ON state of the pinch roller (NO), the pinch roller is turned off and then the take-up reel 6 is controlled to the speed of N times of the normal playback speed. Then the capstan 3 is controlled to the speed of four times of the normal playback speed. Thus the operation is finished. In the confirmation of the ON/OFF of the pinch roller, if the pinch roller is in the OFF state (YES), the take-up reel 6 in this state is controlled to the speed of N times of the normal playback speed and the operation is finished. Also if the absolute value of the input command N is less than four times of the normal playback speed (NO), the ON/OFF state of the pinch roller is confirmed. In the ON state (YES), the speed of the capstan 3 in this state is controlled to the speed of N times of the normal playback speed and the operation is finished. On the other hand, in the OFF state (NO), the take-up reel 6 is once controlled to the speed of four times of the normal playback speed (The capstan 3 is controlled previously to mode of the speed of four times of the normal playback mode.). According to the control circuit 20, the regenerative control signal h and feedback pulse obtained from the frequency generator 25 of the capstan motor 12 are phase-compared and made the phase matching state. The phase matching detection signal obtained by detecting the phase matching is returned to the tape speed commanding means 31. In response to this signal, the tape speed commanding means 31 turns the pinch roller on. And then control by the tape speed commanding means 31 is performed so that the capstan 3 becomes the speed of N times of the normal playback speed being the finally aimed value, and at the same time the take-up reel 6 is made the constant tension control state and the transferring from the high speed driving state to the low speed capstan driving state is finished.

Figure 4:
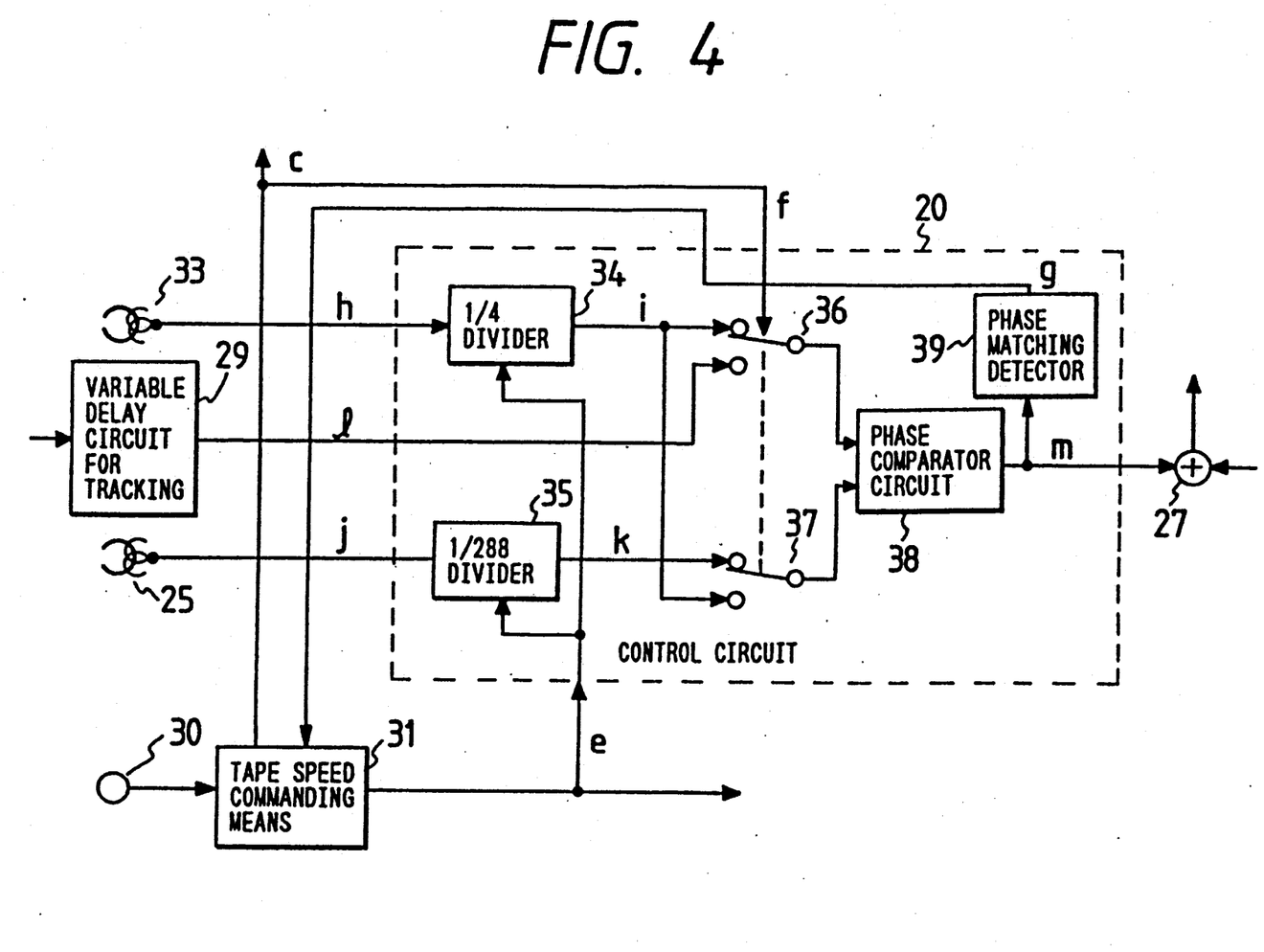
FIG. 4 is a circuit diagram illustrating a specific example of the main part in FIG. 1.
Figure 5:
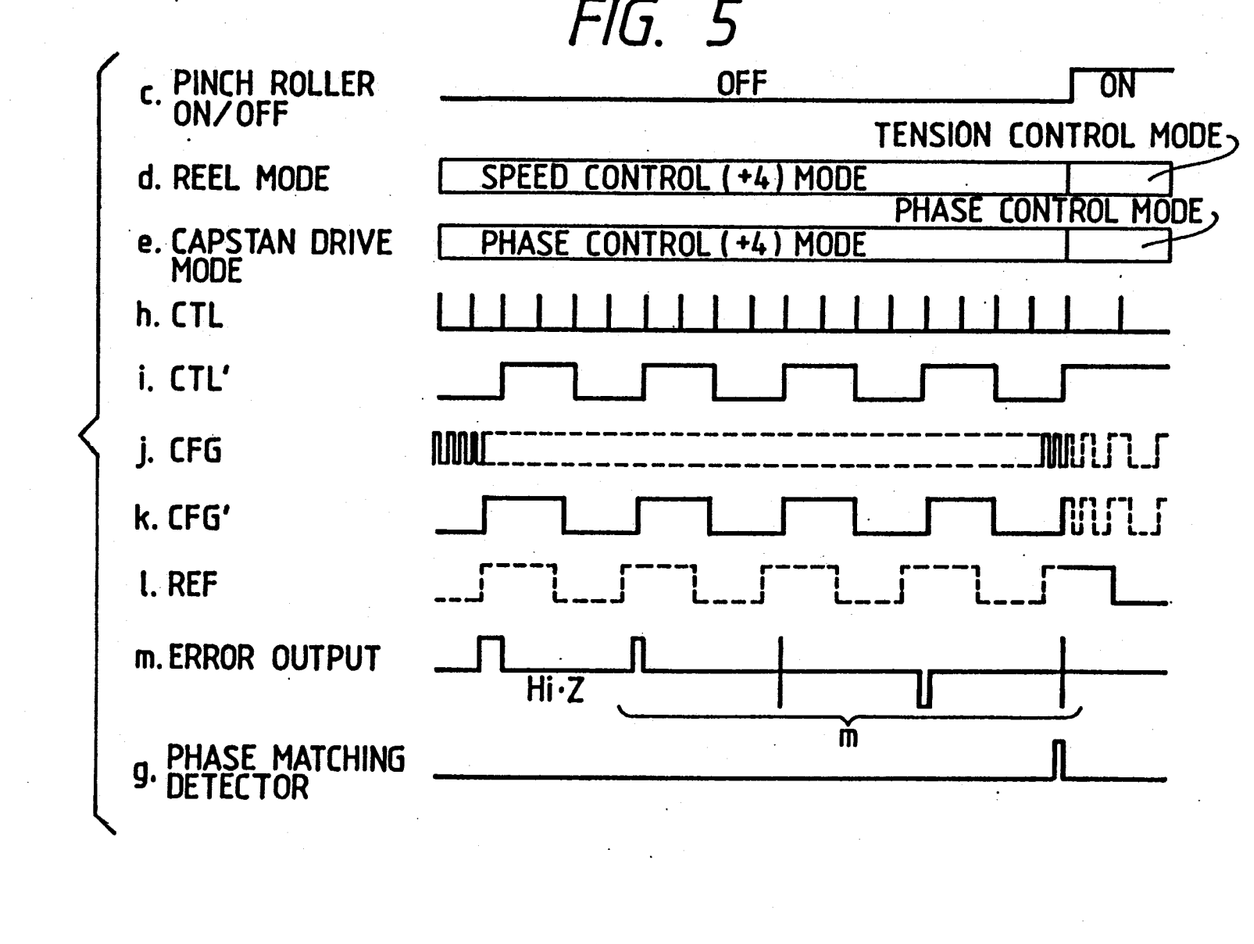
FIG. 5 is a waveform chart illustrating operation waveform of main part in FIG. 4.

Next, an embodiment of the control circuit 20 being the main part of the invention will be described using FIG. 4 and FIG. 5. In these figures, parts similar to those in FIG. 1 shall be designated by the same reference numerals. Numerals 34, 35 designate frequency dividers, numerals 36, 37 designate switching circuits, numeral 38 designates a phase comparator circuit, and numeral 39 designates a phase matching detector. Now, operation of the control circuit 20 at the time of mode variation (the reel mode d and the capstan mode e) shown in FIG. 5 will be described in detail. The period of transition from the high speed reel driving state to the low speed capstan driving state is shown in FIG. 5. In the period of transition, both the take-up reel 6 and the capstan 3 are once controlled to the speed of four times of the normal playback speed. Then the regenerative control signal h regenerated by a control head 33 is frequency-divided in four by the frequency divider 34 and becomes a signal i. On the other hand, CFG signal j being output of the frequency generator 25 of the capstan motor 12 is frequency-divided in 288 by the frequency divider 35 and becomes a signal k. In this case, the switching circuits 36, 37 are changed into state shown in the figure by the ON/OFF command signal c of the operation of the pinch roller 4, 4'. Consequently, the input signals to the phase comparator circuit 38 become the CTL' signal i and the CFG' signal k and the error output signal m by the phase comparison of both is obtained. The error signal m is supplied through the adder 27 and the motor driver 16 to the capstan motor 12, and performs the feedback control so that the CFG' signal k is phase-matched with the CTL' signal i. Then the error signal m is taken in the phase matching detector 39, and decision of the phase matching state is performed by detecting that the period with the error signal m sufficiently small continues for a definite time. For example, in FIG. 5, it is detected that the state of the error amount less than the prescribed value continues m times repeatedly, thereby the phase matching detecting signal g is outputted. The phase matching detecting signal g is fed back to the tape speed commanding means 31, and the pinch roller ON/OFF signal c (and corresponding to the switching signal f) is outputted. By the pinch roller ON/OFF signal c, the plunger 32 is driven and the pinch roller 4 is pressed against the capstan 3 and the magnetic tape 1 is driven. At the same time, the switching circuits 36, 37 are changed. Thereby the input signal to the phase comparator circuit 38 becomes the reference (REF) signal 1 supplied through the variable delay circuit 29 for tracking and the CTL signal i. Consequently, after the pinch roller pressing (ON), the capstan motor 12 is controlled so that the CTL' signal i is phase-matched with the REF signal 1. In FIG. 4 and FIG. 5, at the mode of four times of the normal playback speed, frequency of the CTL h is (30×4) Hz and frequency of the CFG signal j is about (2160×4) Hz. If the frequency ratio A between both is selected in the nearest integer, it follows that A=72. Consequently, error between the CTL signal h representing the speed of the magnetic tape 1 and the CFG signal j representing the rotational speed of the capstan 3 may be made at least 1/72 or less (In the actual state, since the mechanism part is designed so that the ratio A between both becomes integer value, the error becomes sufficiently less than 1/72.).

Figure 6:
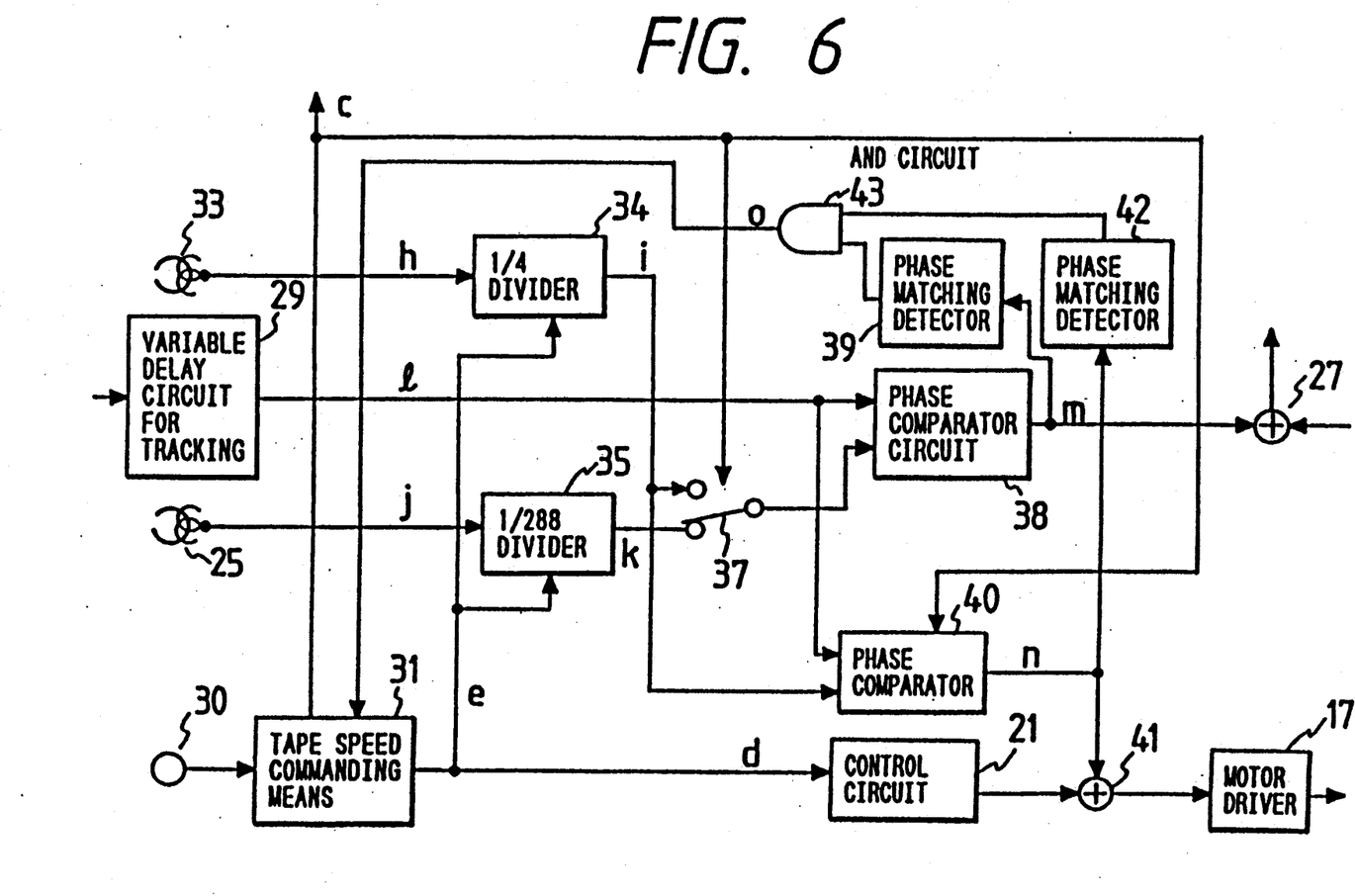
FIG. 6 is a circuit block diagram illustrating another embodiment of the invention.
Figure 7:
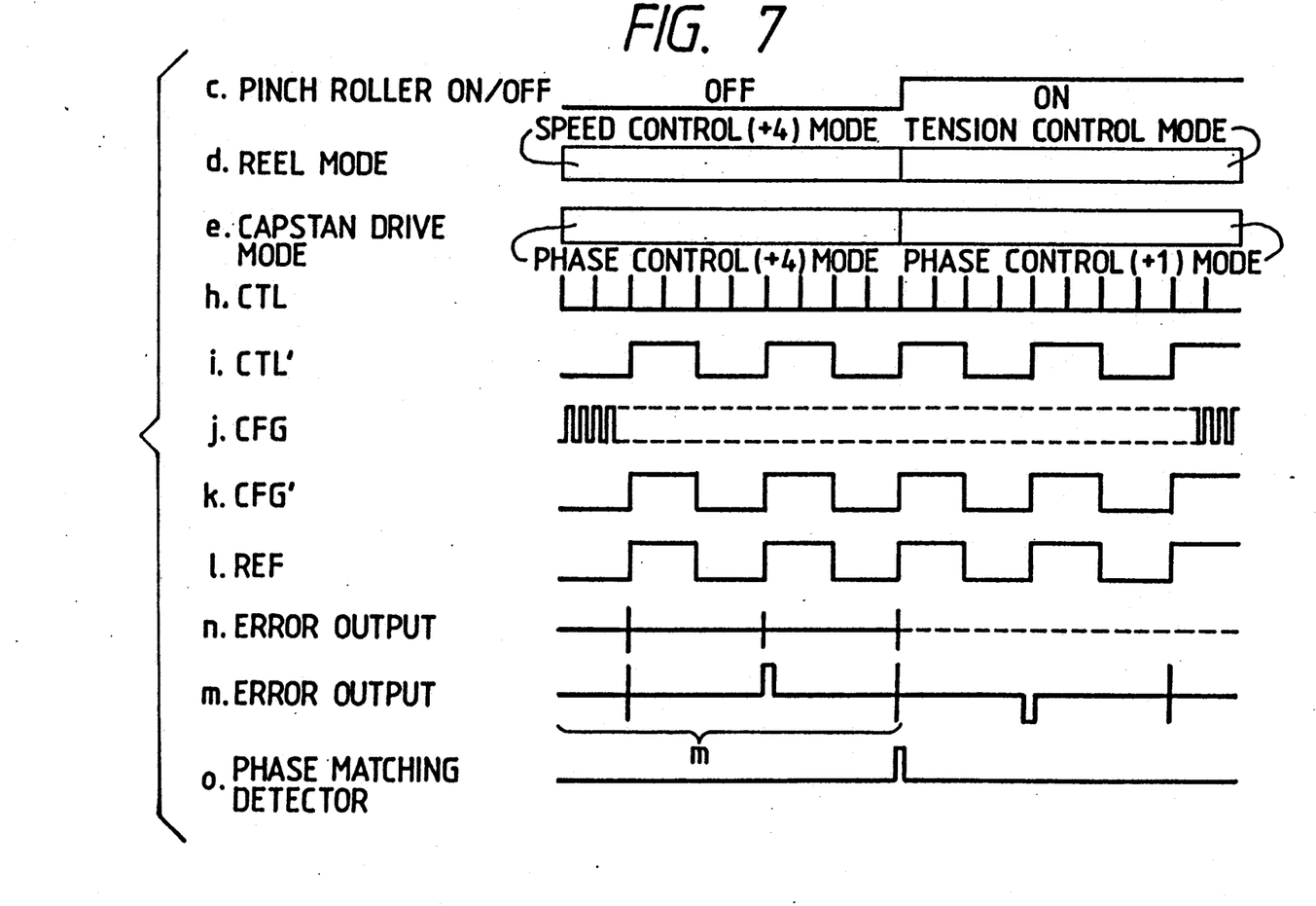
FIG. 7 is a waveform chart illustrating operation of main part in FIG. 6.

Next, another embodiment will be described using FIG. 6 and FIG. 7. In the figures, similar parts to those in FIG. 1 and FIG. 4 shall be designated by the same reference numerals. FIG. 6 shows another embodiment of the control circuits 20 and 21 in FIG. 1. Numeral 40 designates a phase comparator circuit, numeral 41 designates an adder, numeral 42 designates a phase matching detector, and numeral 43 designates an AND circuit. The operation will now be described using FIG. 7. FIG. 7 shows the period of transition from the high speed reel driving state to the low speed capstan driving state (four times of the normal playback speed). During the transferring from the high speed reel driving state to the low speed capstan driving state, the transport at four times of the normal playback speed is once performed at the reel driving state. Then the pinch roller 4' is released from the capstan 3 by the pinch roller ON/OFF signal c, and the CTL signal h regenerated from the control head 33 is frequency-divided in four by the frequency divider 34 and becomes CTL' signal i. Also the CFG signal j of the output of the frequency generator 25 is frequency-divided in 288 by the frequency divider 35 and becomes CFG' signal k. The phase comparator circuit 38 performs phase control of the REF signal l obtained through the variable delay circuit 29 for tracking and the CFG' signal shown in FIG. 1 obtained through the switching circuit 37, and further the capstan motor 12 is driven through the adder 27 and the motor driver 16. On the other hand, the control of the take-up reel motor 13 is performed by adding a phase comparator circuit 40 and the REF signal l and the CTL' signal i are phase controlled thereby the phase matching of the CFG' signal k and the CTL' signal i is performed equivalently and the speed error between both can be made sufficiently small. The phase matching detectors 39 and 42 and the AND circuit 43 are used to detect the phase matching state, and the phase matching of both the capstan motor 12 and the take-up reel motor 13 is detected and the phase detecting signal is fed back to the tape speed commanding means 31. As a result, after the pinch roller 4 is pressed, the switching circuit 37 is inverted and the phase comparator circuite 38 performs phase control of the REF signal l and the CTL' signal i. On the other hand, the phase comparator circuit 40 stops the phase comparing action and prevents the generation of the error output. Thus the object of the invention can be attained. According to the embodiment shown in FIG. 6, even at the reel driving state of four times of the normal playback speed, the tape transport speed with higher precision can be obtained and one input of the phase comparator circuits 38, 40 is limited to the stable REF signal l for the embodiment shown in FIG. 4, thereby the phase control system being relatively stable can be constituted.

According to the invention, the tape transport speed during the reel driving and the capstan rotational speed can be matched at high precision, thereby even if the pinch roller is pressed against the capstan during the tape transport the smooth transferring becomes possible without giving the damage or the like to the tape.

What is claimed is:

1. A tape transport control apparatus comprising:
   low speed capstan driving means for grasping a tape by a capstan and a pinch roller when the tape is transported at low speed including normal speed, for controlling a rotational speed of said capstan to be constant, and for making a tape speed constant;

high speed reel driving means for releasing the pressing of said capstan and said pinch roller when the tape is transported at high speed, for controlling a rotational speed of at least one of a reel at a supply side and a reel at a take-up side, and for making the tape speed constant;

means for executing transferring from a high speed reel driving mode to a low speed capstan driving mode while said tape is being transported; and means for pressing said capstan and said pinch roller when the tape is transported at the low speed driving mode.

2. The tape transport control apparatus as set forth in claim 1, wherein a control circuit for matching the tape speed with a rotational speed of the capstan is provided, at least in a period of transition from the high speed reel driving mode to the low speed capstan driving mode.

3. The tape transport control apparatus as set forth in claim 2, wherein said control circuit is constituted by a phase comparing means for comparing phase of a control signal regenerated on the tape with phase of a capstan frequency generator signal obtained in response to a rotational speed of the capstan.

4. The tape transport control apparatus as set forth in claim 1, having:
a detector for detecting that the transport speed of the tape and the rotational speed of the capstan are nearly coincident; and
means for pressing the capstan and the pinch roller by an output signal of said detector.

5. The tape transport control apparatus as set forth in claim 3, wherein said detector detects an error output signal of the phase comparing means for comparing phase of a control signal regenerated on the tape with phase of a capstan frequency generator signal obtained in response to a rotational speed of the capstan becoming less than the prescribed level plural times continuously.

6. The tape transport control apparatus as set forth in claim 1 having:
a control circuit for matching the tape speed with the rotational speed of the capstan, at least in a period of transition from the high speed reel driving mode to the low speed capstan driving mode;
a detector for detecting that a transport speed of the tape and a rotational speed of the capstan are nearly coincident; and
means for pressing said capstan and said pinch roller in response to an output signal of said detector.

7. The tape transport control apparatus as set forth in claim 6, wherein said control circuit is constituted by a phase comparing means for comparing phase of a control signal regenerated on the tape with phase of a capstan frequency generator signal obtained in response to the rotational speed of the capstan.

8. The tape transport control apparatus as set forth in claim 7, wherein said detector detects that an error output signal of the phase comparing means for comparing phase of the control signal regenerated on the tape with phase of the capstan frequency generator signal obtained in response to the rotational speed of the capstan becomes less than a prescribed level plural times continuously.

9. A tape transport control apparatus comprising:
low speed capstan driving means for grasping a tape by a capstan and a pinch roller when the tape is transported at low speed including normal speed, for controlling a rotational speed of said capstan to be constant, and for making a tape speed constant; and high speed reel driving means for releasing a pressing of said capstan and said pinch roller when the tape is transported at high speed, for controlling a rotational speed of at least one of a reel at a supply side and a reel at a take-up side, and for making the tape speed constant, said tape transport control apparatus having a transition control means comprising:
a control circuit for matching the tape speed with the rotational speed of the capstan, at least in a period of transition form the high speed reel driving means to the low speed capstan driving means;
a detector for detecting that both speeds are nearly coincident; and
an electro-mechanical converting means for pressing the capstan and the pinch roller in response to an output of said detector.

10. The transport control apparatus as set forth in claim 7, wherein said control circuit is constituted by a phase comparing means for comparing phase of a control signal regenerated on the tape with a phase of the capstan frequency generator signal obtained in response to the rotational speed of the capstan.

11. The tape transport control apparatus as set forth in claim 10, wherein said detector detects that an error output signal of the phase comparing means is less than a prescribed level continuously for a plurality of times.

12. A tape transport control apparatus comprising:
a capstan driving means for grasping a tape by a capstan and a pinch roller, for controlling a rotational speed of said capstan to be constant, and for making a tape speed constant; and
a reel driving means for releasing a pressing of said capstan and said pinch roller, for controlling a rotational speed of at least one of a reel at a supply side and a reel at a take-up side, and for making the tape speed constant,
wherein during a tape transport by said reel driving means, the rotational speed of said capstan is controlled by an error signal obtained by phase comparison of a control signal regenerated on the tape and a capstan frequency generator signal obtained in response to the rotational speed of the capstan.

* * * * *

UNITED STATES PATENT AND TRADEMARK OFFICE
CERTIFICATE OF CORRECTION

PATENT NO. : 5,138,504
DATED : August 11, 1992
INVENTOR(S) : Hideo Nishijima, et. al.

It is certified that error appears in the above-indentified patent and that said Letters Patent is hereby corrected as shown below:

On the Title page, item [75], Inventors should read-- Hideo Nishijima; Kooji Kaniwa; Kouji Fujita; Yuji Inaba; all of Katsuta, Japan--.

Column 10, line 24, delete "form" and replace with -- from--.

Signed and Sealed this

Seventeenth Day of August, 1993

Attest:

BRUCE LEHMAN

*Attesting Officer*   *Commissioner of Patents and Trademarks*